Sept. 18, 1962 B. W. ROSS 3,054,616

PHONOGRAPH TAPE ADAPTER

Filed Jan. 7, 1960 4 Sheets-Sheet 1

Byron W. Ross
INVENTOR.

BY Clarence A. O'Brien
and Harvey B. Jacobson
Attorneys

Sept. 18, 1962 B. W. ROSS 3,054,616

PHONOGRAPH TAPE ADAPTER

Filed Jan. 7, 1960 4 Sheets-Sheet 2

Byron W. Ross

INVENTOR.

BY Clarence A. O'Brien and Harvey B. Jacobson

Attorneys

Byron W. Ross
INVENTOR.

BY Clarence A. O'Brien
and Harvey B. Jacobson
Attorneys

Byron W. Ross
INVENTOR.
BY Clarence A. O'Brien
and Harvey B. Jacobson
Attorneys

United States Patent Office 3,054,616

Patented Sept. 18, 1962

3,054,616

PHONOGRAPH TAPE ADAPTER

Byron W. Ross, Big Bear City, Calif.
(38650 Glenbush Ave., Palmdale, Calif.)

Filed Jan. 7, 1960, Ser. No. 1,095
15 Claims. (Cl. 274—11)

This invention relates to an adapter to be used with the existing turntables of phonographs and the like to permit the recording and playing, as well as erasing, of standard magnetic tape at various speeds.

The adapter in accordance with the invention deals with the mechanical functions of moving the tape from the feed reel to the take-up reel and inversely, rewinding from the take-up reel to the feed reel, and moving the tape past a recording head of any standard design. The electronic recording and reproducing circuitry are separately supplied by using commercially available components, even those which may exist in the phonograph or the like which is converted to a combined disk record player and magnetic recorder record player.

Briefly, the adapter uses the rotational force of the turntable for the purpose of operating the various parts of the adapter insofar as mechanical motion is concerned. Consequently, while the adapter is functioning, the disk recording on the turntable, which may be of any standard size, may also be functioning. The obvious result is that a person who wishes, may "tape" a recording and if he desires, use the music of the recording as accompaniment for his pleasure, training, etc. Since speeds of the parts of the adapter are directly proportional to the turntable speed, there is no relative change in speeds between the adapter and the record player turntable, this being an advantage over a separate magnetic recorder and phonograph; although a great advantage is found in the economy of the adapter.

A further object of the invention is to provide a practical adapter which may be applied to all types of popular phonographs and function with equal facility. It has been found that an adapter constructed in accordance with the invention is very smooth and efficient in its operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
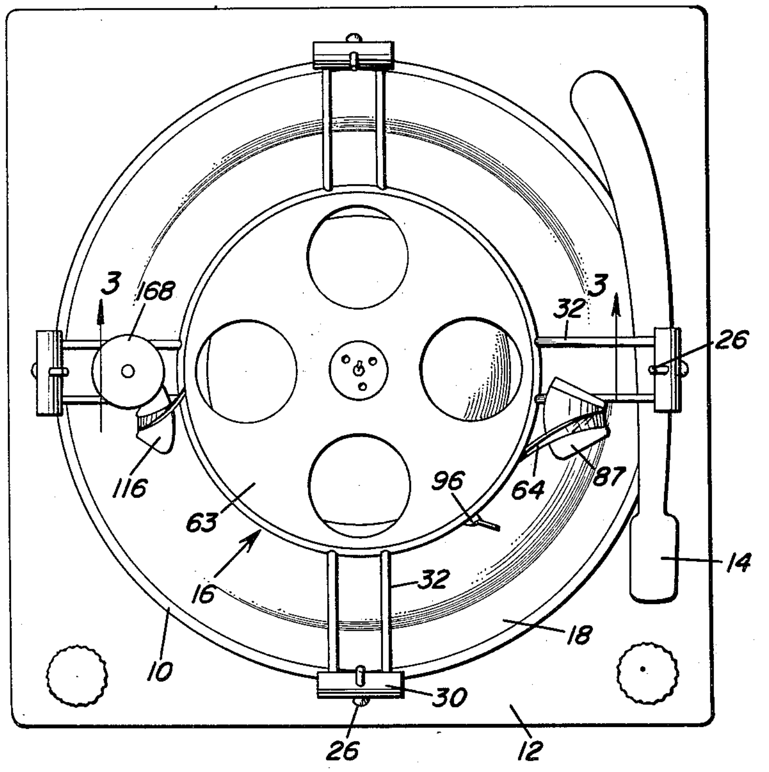
FIGURE 1 is a top view of the adapter applied to a conventional turntable of a phonograph.
Figure 2:
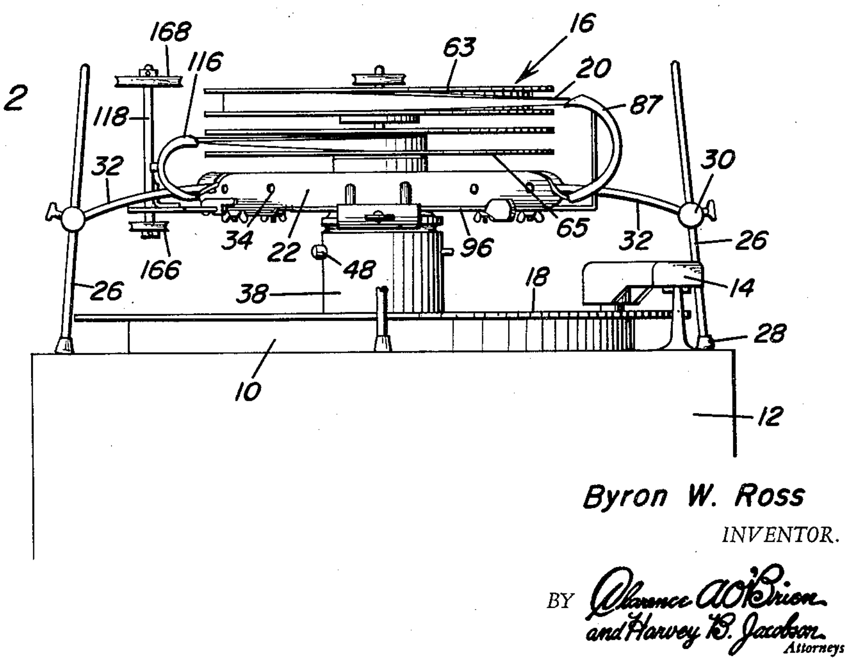
FIGURE 2 is an elevational view of the equipment shown in FIGURE 1.

In the accompanying drawings there is an illustration of a conventional turntable 10 having a base housing 12 in which the mechanism for operating the turntable (not shown) is mounted. Tone arm 14 is illustrated to show that the turntable is essentially unaltered by the use of adapter 16. A conventional recording disk 18 is disposed on the turntable 10, and the tone arm 14 is used with this and the balance of the audio circuitry and components for playing the record.

Adapter 16 uses magnetic tape as a recording and playback medium, and the adapter is used in conjunction with the record player or other equipment with which the diagrammatically represented turntable 10 is associated. This is to allow the flexible use of two recording media in those instances wherein there is already available turntable 10. Adapter 16 is made of a base 22, and the base is supported above turntable 10 by a plurality of groups of legs 26 having rubber feet 28 thereon to seat on the top of housing 12. The legs are vertically adjustably mounted in clamps 30, and the clamps have rods 32 projecting laterally therefrom and frictionally engaging in apertures 34 in the side of base 22. Consequently, a selected group of apertures 34 may be used, and the height of base 22 is left within the discretion of the user.

Figure 3:
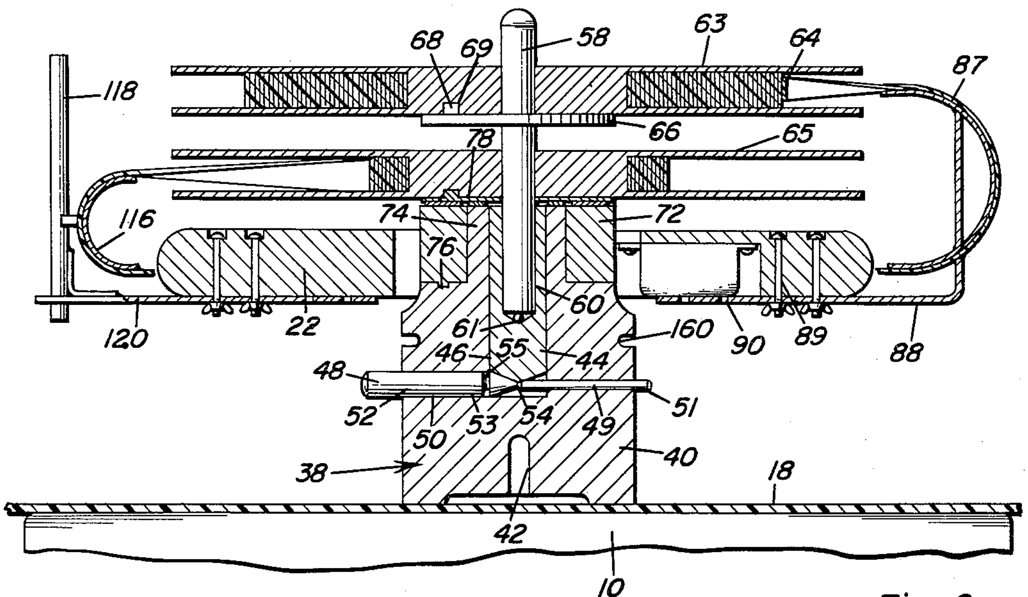
FIGURE 3 is an enlarged vertical sectional view taken on the line 3—3 of FIGURE 1.
Figure 6:
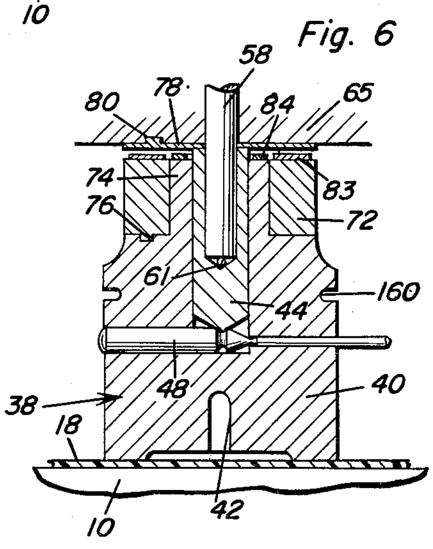
FIGURE 6 is a sectional view of the capstan showing it in the rewind position of adjustment.
Figure 13:
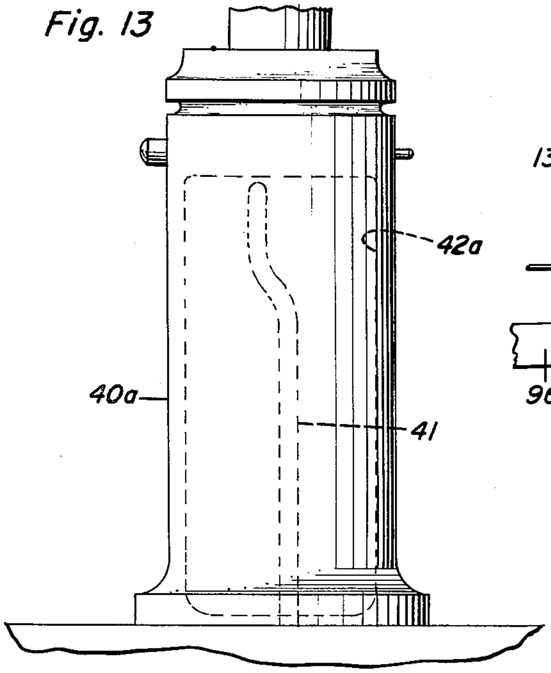
FIGURE 13 is a largely diagrammatic view showing an elongate capstan which is used with those conventional turntables that have a comparatively tall spindle.
Figure 12:
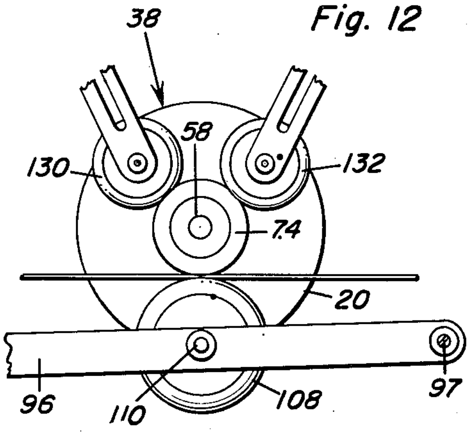
FIGURE 12 is a diagrammatic view showing one method of speed change for the adapter.

Capstan 38 constitutes an important part of the invention, and for the structure thereof attention is invited to FIGURES 3 and 6. The capstan 38 is shown adjusted to the forward or operating position in FIGURE 3 and to the rearward or rewind position in FIGURE 6. Structurally, it consists of a spindle 40 which is directly driven by the phonograph turntable 10 i.e. by fitting over the turntable spindle and resting on the top of a recording disk 18. A downwardly opening recess 42 is formed in the bottom of spindle 40 in order to accept the turntable spindle, and the lower part of this recess is relieved to receive the small diameter 45 r.p.m. conversions disks which are sometimes found in conventional 78 r.p.m. record players. It is within the contemplation of the invention to have adapter 16 be used with the various types of record players, including those with automatic changers. Consequently, a modification of the capstan 38 is shown in FIGURE 13, the modification being essentially identical to adapter 16, the difference being that the capstan spindle 40*a* is taller than spindle 40, and the recess 42*a* is considerably deeper to accommodate the larger turntable spindle 41.

Push rod 44 is mounted for reciprocation in bore 46, and bore 46 is formed axially in spindle 40 and opens through the upper edge thereof. The push rod 44 is capable of being elevated or lowered by laterally adjusting cam shaft 48 which slidably extends through a transverse bore 49 and counterbore 50 in spindle 40. The cam 48 has a reduced diameter part 51 and a larger diameter part 52 seated in the bore and counterbore respectively, and these move through the lower part of bore 46. At the juncture of parts 51 and 52 of cam shaft 48, there is a truncated conical cam 53 with grooves 54 and 55 at the opposite end thereof. When the lower pointed end of push rod 44 seats in groove 54 (FIGURE 3) push rod 44 is in its lowered position. However, when the push rod is moved inwardly (FIGURE 6) the pointed lower end of the push rod 44 rests in groove 55 and this results in an elevation in position of push rod 44 thereby lifting structural parts that are on the upper surface of the push rod.

A free turning shaft 58 is mounted rotationally in bore 60 which is formed coaxially in push rod 44. The lower end of shaft 58 is mounted on a ball bearing 61 disposed in bore 60. The upper reel 63 is a feed reel for magnetic tape 64, and the lower reel 65 is the take-up reel. The feed reel is disposed on a circular plate 66 which is fixed to shaft 58 intermediate the upper and lower ends thereof. Drive pin 68 on plate 66 engages in a notch 69 formed in the hub portion of reel 63. The intermediate part of shaft 58 passes freely through the hub of the take-up reel 65.

Drive collar 72 is mounted on a cylindrical bushing, sleeve or collar 74 which constitutes the upper part of spindle 40. Drive collar 72 is coupled to spindle 40 by the engagement of a projection and opening assembly 76 formed between the lower surface of collar 72 and the upper land formed on spindle 40 and which accommodates the lower surface of drive collar 72.

Figure 5:
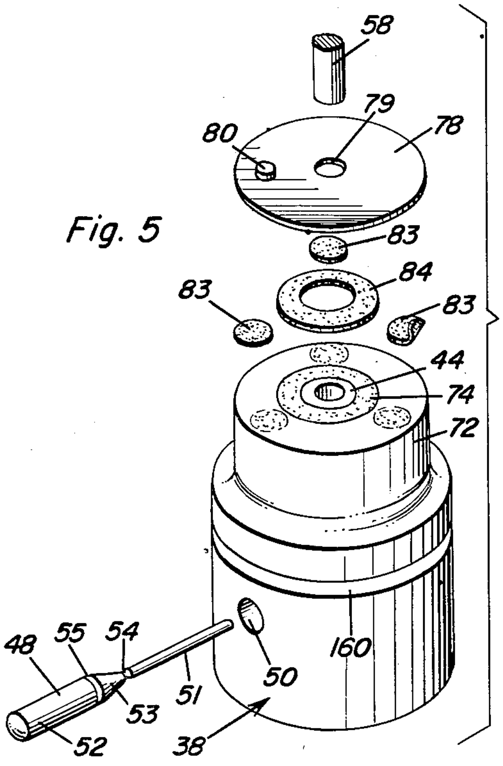
FIGURE 5 is an exploded perspective view showing a part of the capstan constituting an important part of the invention.

A compensation disk 78 is mounted concentrically on shaft 58 by having an opening 79 therein, see FIGURE 5, through which the shaft 58 extends. The drive projection 80 on the upper face of compensation disk 78 engages in a notch in the underside of the hub of take-up reel 65 so that the compensation disk and reel 65 are coupled together to rotate as a unit. Two groups of friction drive members are operatively connected between the compensation disk 78 and collars 72 and 74 when both are used. If only collar 74 is used, only one group of friction drive members are required. The friction drive members consist of pressure sensitive adhesive members. There are three disks 83 adhered to the upper face of collar 72, and a washer 84 which is also made of pressure sensitive adhesive covered thin material, as cellophone tape, and a washer-like disk of pressure sensitive adhesive material is adhered to the upper surface of drive collar 74. All of the adhesive members engage the lower surface of compensation disks 78 to establish a drive connection between the compensation disk and the drive members of the capstan, but yet allow slippage should the forces involved become dangerously high.

Figure 4:
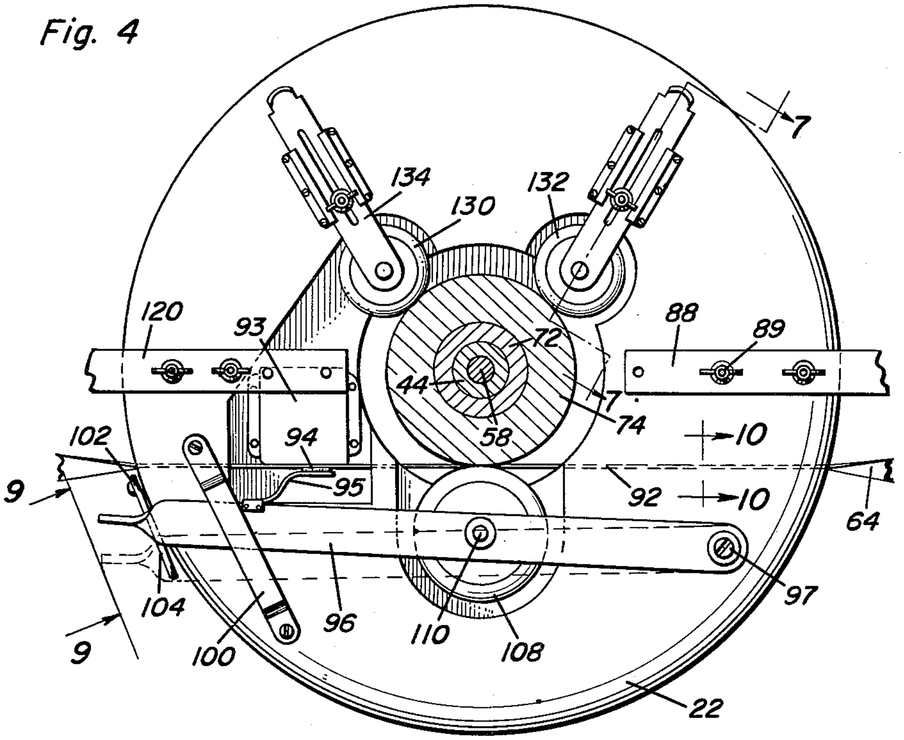
FIGURE 4 is a horizontal sectional view of the adapter.

The magnetic tape 64 is on conventional reels which may be of several conventional diameters. They are placed in the adapter as described (see FIGURE 3). The tape 64 is threaded through an arcuate guide 87 which is supported by bracket 88 the latter being fixed to base 22 by means of adjustable fastening members. The members are composed of bolts 89 fitted in selected openings in a group 90 of openings formed in brackets 88. Guide 87 leads the tape 64 through a transverse slot 92, see FIGURES 4 and 10, in the top surface of the base 22. Slot 92 is on a chord of the circular base and leads the tape across the side or peripheral surface of drive collar 72. (FIGURE 4). The slot also leads tape 64 across the conventional magnetic head 93 which may be of any type, for instance single channel, multi-channel, stereo, etc. Felt pad 94 carried by a light leaf spring arm 95, gently presses against the recording and playback head 93 and the tape 64 passing therebetween. The leaf spring arm 95 is secured to an operating lever 96 pivoted, for instance by pivot 97, to base 22. Bracket 100, for instance a U-shaped bracket, is secured to base 22 and has a portion of lever 96 constrained for limited swinging movement therein. Swinging latch 102 is mounted on a pivot 104 carried by base 22, see FIGURES 4 and 9, and has a hook 106 to engage lever 96 and hold it in a selected position which is the "on" position. The so-called "on" position is established by moving the lever 96 toward drive collar 72 and bringing the tape 64 to bear against the side, cylindrical surface of collar 72 and causing the pad 94 to resiliently urge the tape against the head 93. This is done by friction wheel 108 which is mounted for free rotation on a spindle 110 carried by the lever 96 between its ends. It is preferred that the friction wheel 108 have a resilient covering thereon to enhance frictional grip between the tape and friction wheel, to reduce noise and to serve other secondary purposes inherent in resilient wheels.

Figures 7, 8, 9, 10:
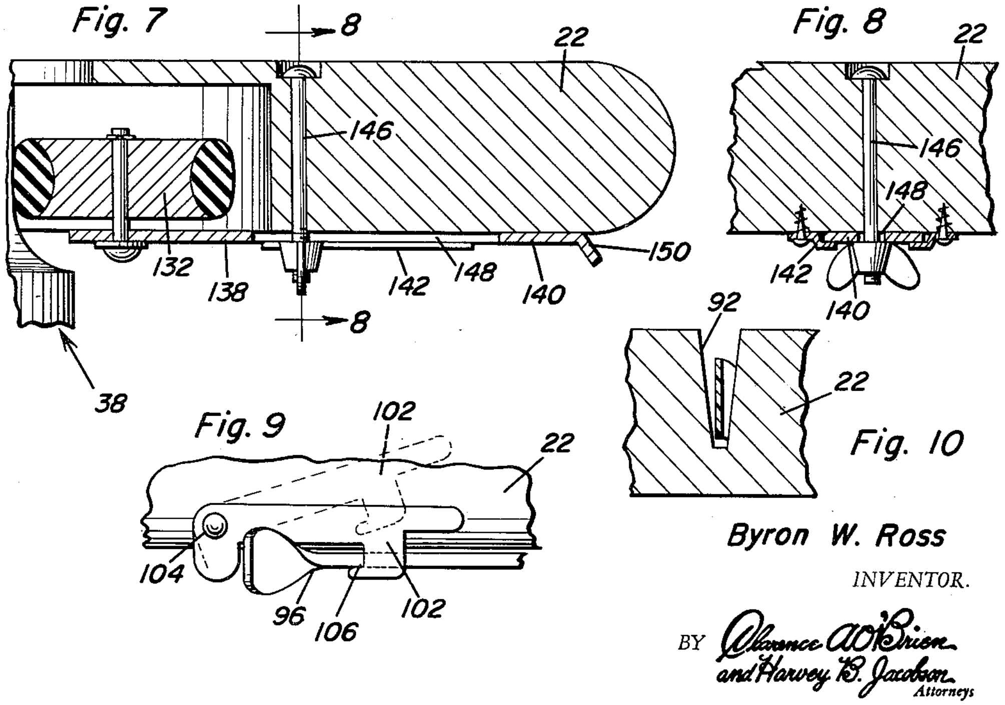
FIGURE 7 is a sectional view taken on the line 7—7 of FIGURE 4 and showing an idler wheel.
FIGURE 8 is a sectional view taken on the line 8—8 of FIGURE 7 and showing one method of adjustment of the idler wheel.
FIGURE 9 is an elevational view taken on the line 9—9 of FIGURE 4 and showing a suggested latch mechanism.
FIGURE 10 is an enlarged sectional view showing the tape slot and taken on the line 10—10 of FIGURE 4.

After passing by the magnetic head 93 the tape enters another guide 116 which is carried by post 118, and the post is secured to a bracket 120. The bracket is adjustably secured to base 22 in the same manner disclosed for the bracket 88. The guide 116 is curved and leads the tape 64 to the take-up reel 65, which would be the reel which is operated by power from the turntable 10, which power has been transmitted through the capstan and friction drive shown in FIGURE 5. As shown in FIGURE 10, the drive collar 72 may be removed thereby utilizing collar 74 which is of a smaller diameter.

A pair of idler wheels 130 and 132 (FIGURE 4) are mounted for rotation on wheel supports 134 and 136, each of which is located on a radius emanating from the axis of rotation of the capstan. Each wheel support is identical with a typical wheel support, see FIGURES 4, 7 and 8, consisting of a sliding plate 140 movable between the rails 142 which define a track secured to the bottom surface of base 22. A bolt 146 attached to the base 22 and passing through a slot 148 in plate 140, may be tightened to hold the wheel 132, while also preferably has a rubber tire thereon, in a selected position of adjustment. For convenience, finger-grip 150 is formed at the outer extremity of plate 140.

Figure 11:
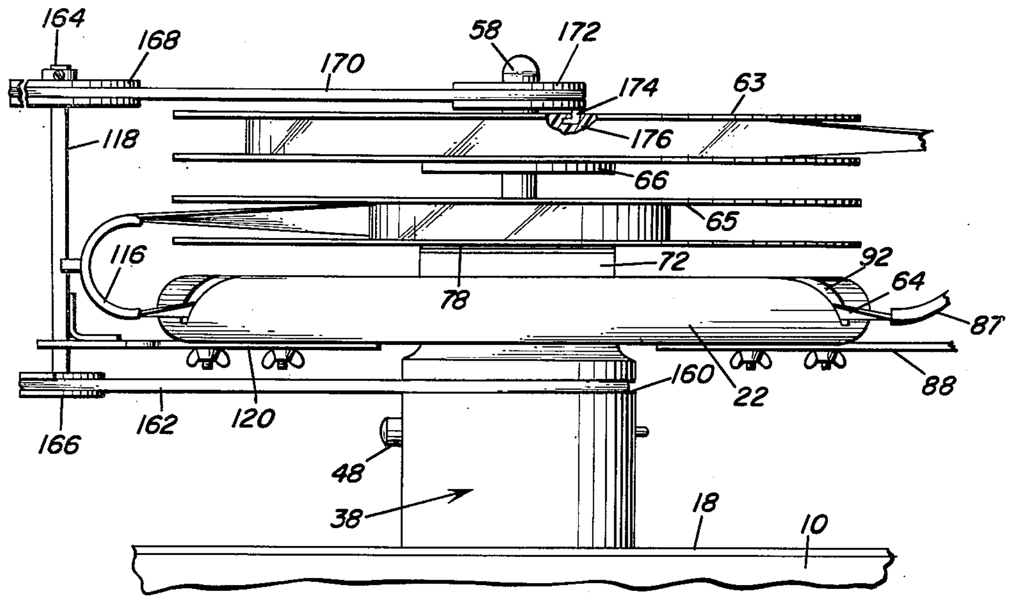
FIGURE 11 is an elevational view showing the adapter in the rewind position.

In operation, the forward motion i.e. that ordinarily used for recording or playback, is the same as has been described. Take-up reel 65 is directly driven by way of the friction clutch, capstan, and the upper surfaces of one or both drive collars 72 and 74 depending on whether both or only one is used. During this operation the feed reel 63 simply idles with shaft 58. For rewind, reel 65 idles while reel 63 is driven through the belt and pulley assembly shown in FIGURE 11. The capstan spindle 40 has a belt groove 160 therein, and belt 162 is entrained therearound. Post 118 is hollow and accommodates a shaft 164, there being pulleys 166 and 168 on the ends thereof. Belt 162 is entrained around pulley 166, while pulley 168 has belt 170 engaged therewith. The belt 170 is also entrained around a "slip-off" pulley 172 mounted on the top of shaft 58 and having a projection 174 extending from its lower face and engageable in a notch 176 in the top reel 63.

When the cam shaft 48 is moved inwardly (FIGURE 6) reel 65 and compensation disk 78 are elevated a short distance, but an amount sufficient to separate the friction drive members 83 and 84 from the compensation disk. Reel 63 becomes the reel which is mechanically driven from turntable 10, through the drive line which includes the two belts 162 and 170 together with the pulleys with which the belts are engaged.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An adapter for a conventional turntable of the phonograph type which is adapted to support a disk recording, said adapter converting the phonograph turntable to a magnetic tape transport drive mechanism said adapter including a capstan having a spindle and adapted to be driven by the turntable by seating directly on the turntable and selectively seating on a recording disk located on the turntable, a base, means for supporting said base in a comparatively fixed position, means for supporting a take-up reel on said capstan and for driving said take-up reel, tape guide means in said base through which the tape is lead when moving toward and onto said take-up reel, a feed reel, means mounting said feed reel on said capstan for idling movement so that the tape therefrom may be fed to said guide of said base and onto said take-up reel and a play back and recording head positioned for passage of said tape in operative association therewith, said means mounting said feed reel on said capstan including a free turning shaft, a push rod carried by said spindle and having a bearing opening in which said free turning shaft is mounted for rotation, said means for driving said take-up reel including a friction clutch between said push rod and said take-up reel, and actuating means connected with said spindle and engaging said push rod to move said push rod in a direction to disengage said friction clutch thereby separating said take-up reel from its driving connection with said spindle.

2. An adapter for a conventional turntable of the phonograph type which is adapted to support a disk recording, said adapter converting the phonograph turntable to a magnetic tape transport drive mechanism said adapter including a capstan having a spindle and adapted to be driven by the turntable by seating directly on the turntable and selectively seating on a recording disk located on the turntable, a base, means for supporting said base in a comparatively fixed position, means for supporting a take-up reel on said capstan and for driving said take-up reel, tape guide means in said base through which the tape is lead when moving toward and onto said take-up reel, a feed reel, means mounting said feed reel on said capstan for idling movement so that the tape therefrom may be fed to said guide of said base and onto said take-up reel and a play back and recording head positioned for passage of said tape in operative association therewith, said means mounting said feed reel on said capstan including a free turning shaft, a push rod carried by said spindle and having a bearing opening in which said free turning shaft is mounted for rotation, said means for driving said take-up reel including a friction clutch between said push rod and said take up reel, and actuating means connected with said spindle and engaging said push rod to move said push rod in a direction to disengage said friction clutch thereby separating said take-up reel from its driving connection with said spindle, a rewind mechanism connected between said spindle and said feed reel to drivingly connect said spindle with said feed reel and thereby rotate said feed reel when said take-up reel friction clutch is disengaged.

3. The subject matter of claim 2 wherein said friction clutch includes a plurality of friction elements, a compensation disk coupled to said take-up reel and against which the friction elements are adapted to bear, and the upper part of said spindle having said friction elements adhered thereto.

4. The subject matter of claim 3 wherein said friction elements include a thin film of material having pressure sensitive adhesive on opposite faces thereof.

5. The subject matter of claim 2 wherein said guide of said base includes an elongated slot, a recording and playback head carried by said base and in alignment with said slot.

6. The subject matter of claim 5 wherein there is an operating lever movably carried by said base, and a pad carried by said lever and adapted to be brought against said tape to lightly press said tape toward said head when said lever is moved to a predetermined position.

7. The subject matter of claim 5 wherein there is a lever movably carried by said base, said lever having a friction wheel thereon in laterally spaced position with reference to the tape in said slot, and said lever adapted to be moved to a position at which said wheel contacts said tape and moves said tape against a portion of said spindle to drive said tape.

8. An adapter for a disk recording type of turntable, said adapter comprising a spindle adapted to be driven by the turntable, a base, means for supporting said base in a comparatively fixed position with reference to said spindle, said spindle having an inner drive collar and an outer drive collar separably carried on the outer peripheral part of the inner drive collar whereby said outer drive collar may be removed thereby exposing said inner drive collar, a feed reel, means which are free turning and carried by said spindle to support said feed reel, a take-up reel, drive means connected between said collars and said take-up reel to propel said take-up reel, said base having a tape guide therein through which the tape extends as it passes from the feed reel to said take-up reel, a recording head carried by said base, a lever movably carried by said base, an idler wheel carried by said lever and movable therewith to a position at which a portion of said tape is pressed against said outer drive collar and selectively against said inner drive collar when said outer drive collar is removed to thereby function as a speed changer.

9. The subject matter of claim 8 wherein said drive means connected between said take-up reel and said spindle consists of a friction clutch.

10. The subject matter of claim 9 wherein said there are means connected with said spindle and said take-up reel to disengage the friction clutch thereby causing the take-up reel to be free turning.

11. The subject matter of claim 10 wherein there are means connected between said spindle and said feed reel to establish a drive connection between said spindle and said feed reel when said clutch is engaged.

12. An adapter for a conventional phonograph record player of the type having a turntable for supporting a record disk and with said turntable having a spindle; said adapter comprising a capstan having a body with a recess therein for loosely receiving said spindle, said capstan having a surface for resting upon a turntable or a record disk thereon for driving thereby, a base surrounding said capstan, means supporting said base above said turntable, vertically spaced feed and take-up reels for a magnetic recording element, means on said capstan for supporting and driving said take-up reel, means on said capstan supporting for free rotation said feed reel, a magnetic play back and recording head mounted on said base, means for causing passage of said recording element in operative association with said magnetic head means carried by said capstan and manually operable to disengage the driving and supporting engagement between said capstan and said take-up reel and supporting the latter of free rotation for recording, said capstan having a vertically slidable member mounted thereon and engageable with said take-up reel for lifting the latter out of driving and supporting engagement with said spindle, actuating means to effect lifting and lowering of said member.

13. The combination of claim 12 wherein said slidable member has journal means rotatably supporting said feed reel.

14. An adapter for a conventional phonograph record player of the type having a turntable for supporting a record disk and with said turntable having a spindle; said adapter comprising a capstan having a body with a recess therein for loosely receiving said spindle, said capstan having a surface for resting upon a turntable or a record disk thereon for driving thereby, a base surrounding said capstan, means supporting said base above said turntable, vertically spaced feed and take-up reels for a magnetic recording element, means on said capstan for supporting and driving said take-up reel, means on said capstan supporting for free rotation said feed reel, a magnetic play back and recording head mounted on said base, means for causing passage of said recording element in operative association with said magnetic head said capstan having an upwardly projecting diametrically reduced stem, a drive collar slidably surrounding said stem and having an upper surface, means lockingly engaging said capstan and said drive collar, drive means on said top surface of said drive collar for engaging said take-up reel.

15. The combination of claim 14 wherein the top surfaces of said drive collar and said stem are coplanar, said means lockingly engaging said take-up reel being diposed on both said top surfaces.

References Cited in the file of this patent

UNITED STATES PATENTS

| | | |
|---|---|---|
| 2,396,563 | Fries | Mar. 12, 1946 |
| 2,828,367 | Sibbet | Mar. 25, 1958 |

FOREIGN PATENTS

| | | |
|---|---|---|
| 636,993 | Great Britain | May 10, 1950 |

OTHER REFERENCES

Publication: (1) Presto Manufacturing Co. Advertisement of their turntable tape reproducer (TL–10), December 1951.

Publication: (2) Park Radio Advertisement of their turntable tape reproducer. July 1950 Wireless World vol. 56, issue 7, pp. 38.